United States Patent
Lee et al.

(10) Patent No.: US 9,057,530 B2
(45) Date of Patent: Jun. 16, 2015

(54) HUMIDIFYING MEDIUM HAVING EXCELLENT LIFESPAN CHARACTERISTICS AND METHOD OF MANUFACTURING THE SAME

(75) Inventors: Ju-Hyung Lee, Uiwang-si (KR); Moon-Suk Han, Seoul (KR); Seong-Moon Jung, Daejeon (KR)

(73) Assignee: LG HAUSYS, LTD., Seoul (KR)

( * ) Notice: Subject to any disclaimer, the term of this patent is extended or adjusted under 35 U.S.C. 154(b) by 447 days.

(21) Appl. No.: 13/640,597

(22) PCT Filed: Apr. 12, 2011

(86) PCT No.: PCT/KR2011/002564
§ 371 (c)(1),
(2), (4) Date: Oct. 11, 2012

(87) PCT Pub. No.: WO2011/129581
PCT Pub. Date: Oct. 20, 2011

(65) Prior Publication Data
US 2013/0026666 A1 Jan. 31, 2013

(30) Foreign Application Priority Data
Apr. 12, 2010 (KR) .................. 10-2010-0033198

(51) Int. Cl.
*B01F 3/04* (2006.01)
*F24F 6/04* (2006.01)
(Continued)

(52) U.S. Cl.
CPC .............. *F24F 6/04* (2013.01); *Y10T 156/10* (2013.01); *B32B 29/005* (2013.01); *B32B 29/08* (2013.01);
(Continued)

(58) Field of Classification Search
CPC . F24F 6/04; F24F 2203/10; F24F 2203/1048; D21H 27/30; D21H 27/10; B32B 29/08; B32B 29/005; B32B 2250/26; Y10T 156/10
USPC ........... 261/100, 102, 104, 105, 107; 156/60, 156/184, 280
See application file for complete search history.

(56) References Cited

U.S. PATENT DOCUMENTS 2,265,500 A * 12/1941 Stuart .............................. 261/92
2,973,295 A * 2/1961 Rodgers, Jr. .................. 428/160
(Continued)

FOREIGN PATENT DOCUMENTS

JP      59-60137 A      4/1984
JP      08-021644 A      1/1996
(Continued)

OTHER PUBLICATIONS

Official Action issued in Chinese Patent Application No. 201180015810.9 dated Jun. 6, 2014, eight (8) pages.

*Primary Examiner* — Charles Bushey
(74) *Attorney, Agent, or Firm* — Nath, Goldberg & Meyer; Jerald L. Meyer

(57) ABSTRACT

Disclosed herein is a humidifying medium which adopts a natural humidifying system and has excellent lifespan characteristics. The humidifying medium according to the present invention is formed by coupling a linerboard to one or both sides of a corrugated board. The corrugated board and the linerboard have different average pore diameters, and the humidifying medium of the present invention may be formed by coupling a linerboard having an average pore diameter of 35~40 μm to one or both sides of a corrugated board having an average pore diameter of 8~10 μm.

16 Claims, 3 Drawing Sheets

(51) Int. Cl.
   *B32B 29/00* (2006.01)
   *B32B 29/08* (2006.01)
   *D21H 27/30* (2006.01)
   *D21H 27/10* (2006.01)

(52) U.S. Cl.
   CPC ............ *B32B 2250/26* (2013.01); *D21H 27/10* (2013.01); *D21H 27/30* (2013.01); *F24F 2203/1048* (2013.01); *F24F 2203/10* (2013.01)

(56) References Cited

U.S. PATENT DOCUMENTS

| | | | |
|---|---|---|---|
| 8,388,719 B2* | 3/2013 | Lee et al. | 55/523 |
| 2003/0165638 A1* | 9/2003 | Louks et al. | 427/600 |
| 2004/0231307 A1* | 11/2004 | Wood et al. | 55/523 |
| 2008/0116592 A1* | 5/2008 | James | 261/23.1 |
| 2012/0032359 A1* | 2/2012 | Jung et al. | 261/92 |

FOREIGN PATENT DOCUMENTS

| | | |
|---|---|---|
| JP | 09-019619 A | 1/1997 |
| JP | 2004-271156 A | 9/2004 |
| JP | 2006-200834 A | 8/2006 |
| JP | 2008-286494 A | 11/2008 |
| KR | 20-0306489 Y1 | 2/2003 |
| KR | 20-0388854 Y1 | 6/2005 |
| KR | 10-2010-0019751 A | 2/2010 |
| KR | 10-2010-0023518 A | 3/2010 |
| KR | 20100023518 A | 3/2010 |
| WO | 99/51327 A1 | 10/1999 |

* cited by examiner

HUMIDIFYING MEDIUM HAVING EXCELLENT LIFESPAN CHARACTERISTICS AND METHOD OF MANUFACTURING THE SAME

This is a National Phase Application filed under 35 U.S.C. 371 as a national stage of PCT/KR2011/002564, filed Apr. 12, 2011, and claims priority from Korean Application No. 10-2010-0033198, filed Apr. 12, 2010, the content of each of which is hereby incorporated by reference in its entirety.

TECHNICAL FIELD

The present invention relates to a humidifying medium for natural humidification, and more particularly, to a corrugated board type humidifying medium for natural humidification, which includes a corrugated board and a linerboard having different pore distributions to enhance durability with respect to inorganic substances, thereby improving lifespan characteristics.

BACKGROUND ART

Humidification may be carried out by natural humidification, evaporative humidification, supersonic humidification, or the like.

In particular, natural humidification generates a smaller amount of water molecules than supersonic humidification and covers a large humidifying area, thereby providing excellent humidification effects throughout a large area. In addition, the natural humidification consumes lower power than evaporative humidification or supersonic humidification, thereby satisfying requirement for economically friendliness.

Natural humidification is based on a principle that a humidifying medium having a large surface area and many pores absorbs water and provides humidification while being exposed to dry air. Therefore, a corrugated board type humidifying medium is generally used in the art in order to maximize the surface area of the humidifying medium to be exposed to the dry air.

The most important issue of conventional corrugated board type humidifying media is short lifespan due to deposition of inorganic substances therein. Water contains various substances such as calcium (Ca), sodium (Na), magnesium (Mg), various minerals, etc., which are deposited in the form of calcium carbonate and other types of inorganic compounds when water is evaporated from the humidifying medium.

Then, the pores of the humidifying medium are filled with the deposited inorganic compounds and the amount of water to be absorbed by the humidifying medium is decreased, thereby causing reduction in humidification amount below an initial humidification amount over time.

Accordingly, it is necessary for the humidifying medium to be subjected to frequent cleaning in order to maintain high humidification performance. However, even after the humidifying medium is subjected to cleaning, the amount of calcium carbonate or other inorganic compounds removed from the humidifying medium by cleaning is too small to provide significant enhancement of humidification.

To solve this problem, there has been proposed a method of enlarging the pore of the humidifying medium to increase the amount of the deposited inorganic substances to be removed. However, the enlarged pores of the humidifying medium deteriorate capillarity of the humidifying medium, causing difficulty in maintaining proper humidification.

DISCLOSURE

Technical Problem

The present invention is directed to a humidifying medium capable of improving lifespan characteristics with good durability with respect to inorganic substances while maintaining good humidification performance through natural humidification.

The present invention is also directed to a method of manufacturing a humidifying medium for natural humidification having excellent lifespan characteristics.

Technical Solution

One aspect of the present invention provides a humidifying medium, which includes a corrugated board and a linerboard coupled to one or both sides of the corrugated board, wherein the corrugated board and the linerboard have different average pore diameters.

The average pore diameter of the linerboard may be larger than that of the corrugated board, and the average pore diameter of the linerboard may be 3~6 times larger than that of the corrugated board.

The linerboard or the corrugated board may include inorganic paper such as ceramic paper or glass paper.

The humidifying medium may be wound to have a honeycomb structure.

The humidifying medium may be coated with an inorganic material or organic material, and the inorganic material or the organic material may include a disinfectant or an antibacterial agent. The humidifying medium may be coated with $TiO_2$ and alumina.

Another aspect of the present invention provides a humidifying medium wherein a linerboard including pores having an average diameter of 35~50 μm is coupled to one or both sides of a corrugated board including pores having an average diameter of 8~10 μm.

A further aspect of the present invention provides a method of manufacturing a humidifying medium, including: preparing a linerboard and a corrugated board having different average pore diameters from each other; and coupling the linerboard to one or both sides of the corrugated board.

The method may further include winding the humidifying medium to have a honeycomb structure.

The method may further include coating the humidifying medium with an inorganic material or organic material. Specifically, the manufactured humidifying medium may be dipped into a slurry that contains 100 parts by weight of water, 5~15 parts by weight of ethanol, 1~5 parts by weight of $TiO_2$, and 5~15 parts by weight of an alumina sol containing 10~30% by weight of solid, followed by drying at 100~150° C.

Advantageous Effects

According to the present invention, the humidifying medium is manufactured by coupling a linerboard including pores having an average diameter of 35~50 μm to one or both sides of a corrugated board including pores having an average diameter of 8~10 μm.

The pores of the corrugated board serve to absorb water and provide proper humidification performance, and the pores of the linerboard serve as storage for deposited inorganic substances, thereby improving lifespan characteristics while maintaining the proper humidification performance.

In addition, the humidifying medium has a large humidification range through natural humidification and is environmentally-friendly through less power consumption.

BEST MODEL

Figure 1:
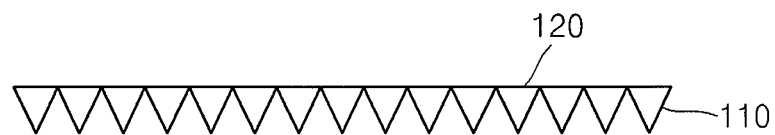
FIG. 1 is a schematic view of a humidifying medium according to one embodiment of the present invention.

The above and other aspects, features, and advantages of the invention will become apparent from the detailed description of the following embodiments in conjunction with the accompanying drawings. It should be understood that the present invention is not limited to the following embodiments and may be embodied in different ways, and that the following embodiments are given to provide complete disclosure of the present invention and to provide a thorough understanding of the invention to those skilled in the art. The scope of the invention is defined only by the claims. Like components will be denoted by like reference numerals throughout the specification.

A humidifying medium excellent in a lifespan characteristics and a method of manufacturing the same according to embodiments of the present invention will now be described in detail with reference to the accompanying drawings.

A humidifying medium according to some embodiments of the invention is a corrugated board type humidifying medium applied to a natural humidification system. As described above, natural humidification generates a small amount of water molecules to have a large humidification range, consumes less power than other humidification systems, and is environmentally friendly.

Figure 2:
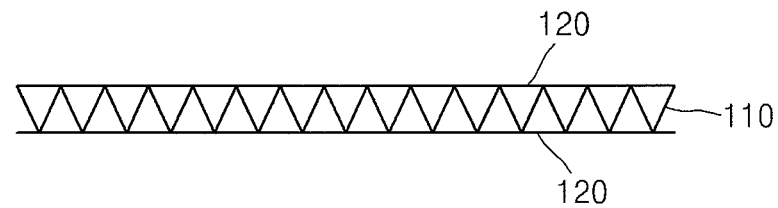
FIG. 2 is a schematic view of a humidifying medium according to another embodiment of the present invention.

FIGS. 1 and 2 are schematic views of humidifying media according to exemplary embodiments of the present invention.

Specifically, FIG. 1 shows a linerboard 120 coupled to one side of a corrugated board 110, and FIG. 2 shows linerboards 120 coupled to both sides of the corrugated board 110.

The humidifying media according to the embodiments as shown in FIGS. 1 and 2 are manufactured by coupling the linerboard 120 to one or both sides of the corrugated board 110.

In these humidifying media according to the embodiments of the invention, the corrugated board 110 and the linerboard 120 have different average pore diameters. The average pore diameter indicates an average diameter of pores in the corrugated board 110 or an average diameter of pores in the linerboard 120.

Among the pores of the corrugated board 110 and the pores of the linerboard 120, the pores having a relatively small average diameter serve to absorb water and secure a proper humidification amount. On the other hand, the pores having a relatively large average diameter serve as deposition storages for inorganic substances such as calcium carbonate or the like deposited after humidification.

In the case where the corrugated board 110 and the linerboard 120 have different average pore diameters, the average pore diameter of the corrugated board 110 may be larger than that of the linerboard 120. Alternatively, the average pore diameter of the linerboard 120 may be larger than that in the corrugated board 110.

At this time, advantageously, the average pore diameter of the linerboard 120 is larger than that of the corrugated board 110. This is because the pores of the corrugated board 110 having a relatively large surface area serve to absorb water, and the pores of the linerboard 120 having a relatively small surface area serve as the deposition storages for calcium carbonate or other inorganic substances, thereby increasing humidification efficiency.

In the case where the average pore diameter of the linerboard 120 is larger than that of the corrugated board 110, the average pore diameter of the linerboard 120 may be 3~6 times larger than that of the corrugated board 110.

If the average pore diameter of the linerboard 120 is not more than 3 times larger than that of the corrugated board 110, the pores of the linerboard 120 provide an insufficient function of storing the deposited inorganic compounds such as calcium carbonate or the like, thereby lowering an effect of improving the lifespan of the humidifying medium.

If the average pore diameter of the linerboard 120 is not less than 6 times larger than that of the corrugated board 110, it is possible to improve the effect of storing the deposited inorganic compounds such as calcium carbonate or the like, but it is difficult to secure desired humidification performance due to deterioration in capillarity of the humidifying medium.

Preferably, the corrugated board has an average pore diameter of 8~10 μm, and the linerboard has an average pore diameter of 35~40 μm.

In this embodiment, the corrugated board 110 or the linerboard 120 may be comprised of any paper so long as they have different average pore diameters. However, the corrugated board 110 or the linerboard 120 may be prepared in the form of inorganic paper made of an inorganic material and containing pulp. The inorganic paper may contain about 20~35 wt % of pulp.

The inorganic paper may include ceramic paper or glass paper. If inorganic paper is used for the humidifying medium, it is advantageously possible to increase strength of the humidifying medium and easy to keep an original shape of the humidifying medium.

Figure 3:
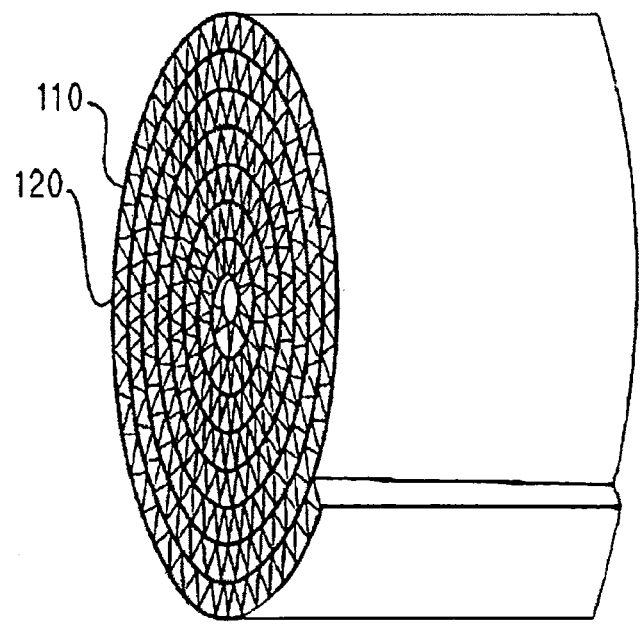
FIG. 3 is a view of a humidifying medium having a honeycomb structure according to one embodiment of the present invention.

FIG. 3 is a view of a humidifying medium having a honeycomb structure according to one embodiment of the present invention.

Referring to FIG. 3, the humidifying medium according to this embodiment has a honeycomb structure by winding. In this embodiment, it is possible to increase the surface area of the humidifying medium, thereby increasing the number of pores in the corrugated board 110 and the linerboard 120. As such, with the honeycomb structure, the humidifying medium may provide a large humidification amount and a sufficient space for storing inorganic substances deposited, thereby improving humidifying effect and lifespan.

In some embodiments, the humidifying medium may be coated with an inorganic material or an organic material. The inorganic material or organic material may be uniformly coated throughout the humidifying medium, or partially coated on the humidifying medium. The kind of inorganic material or organic material to be coated may be selected for various purposes including reinforcement.

In particular, sterilization or antibacterial performance is important for the humidifying medium in current lifestyle, and therefore the inorganic material or the organic material coated on the humidifying medium may contain disinfectant or antibacterial materials.

Examples of the inorganic material to be coated on the humidifying medium include $TiO_2$ and alumina ($Al_2O_3$). $TiO_2$ and alumina can reinforce the humidifying medium, absorb bad smell or the like, and easily decompose toxic substances.

Figure 4:
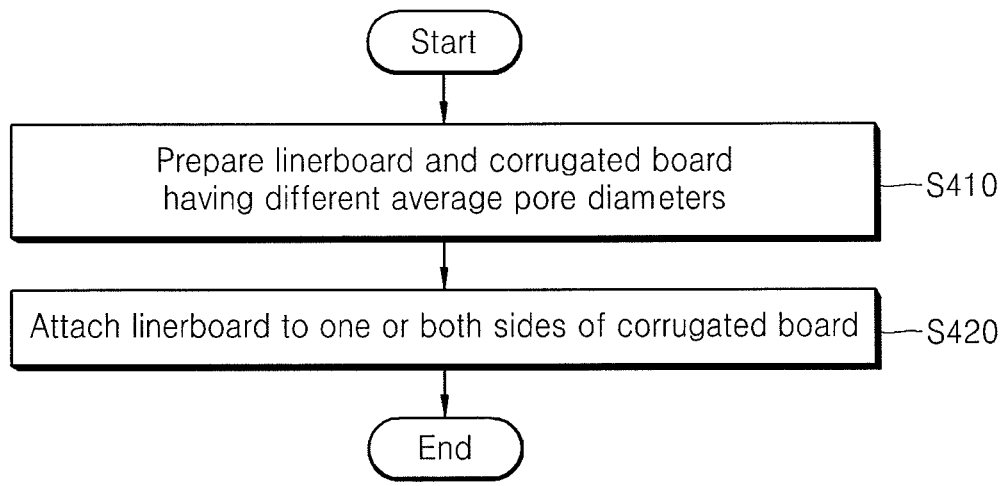
FIG. 4 is a flowchart of a method of manufacturing a humidifying medium according to one embodiment of the present invention.

FIG. 4 is a flowchart of a method of manufacturing a humidifying medium according to one embodiment of the present invention.

Referring to FIG. 4, the humidifying medium according to this embodiment may be manufactured by preparing a corrugated board and a linerboard having different average pore diameters (S410), and attaching the linerboard to one or both sides of the corrugated board (S420).

The average pore diameters of the corrugated board and the linerboard are the same as described above, and thus repeated descriptions thereof will be omitted.

Figure 5:
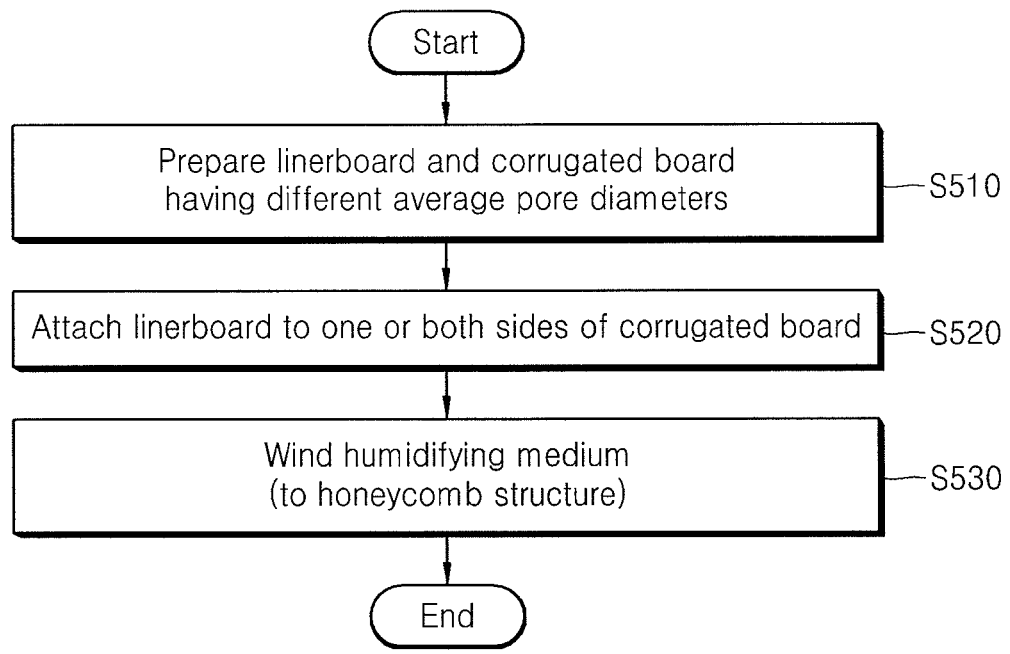
FIG. 5 is a flowchart of a method of manufacturing a humidifying medium according to another embodiment of the present invention.

FIG. 5 is a flowchart of a method of manufacturing a humidifying medium according to another embodiment of the present invention.

Referring to FIG. 5, in the method according to this embodiment, operations of preparing a corrugated board and a linerboard (S510) and attaching the linerboard to one or both sides of the corrugated board (S520) are the same as those in S410 and S420 shown in FIG. 4.

However, the method according to this embodiment further includes winding the humidifying medium to have a honeycomb structure (S530).

Figure 6:
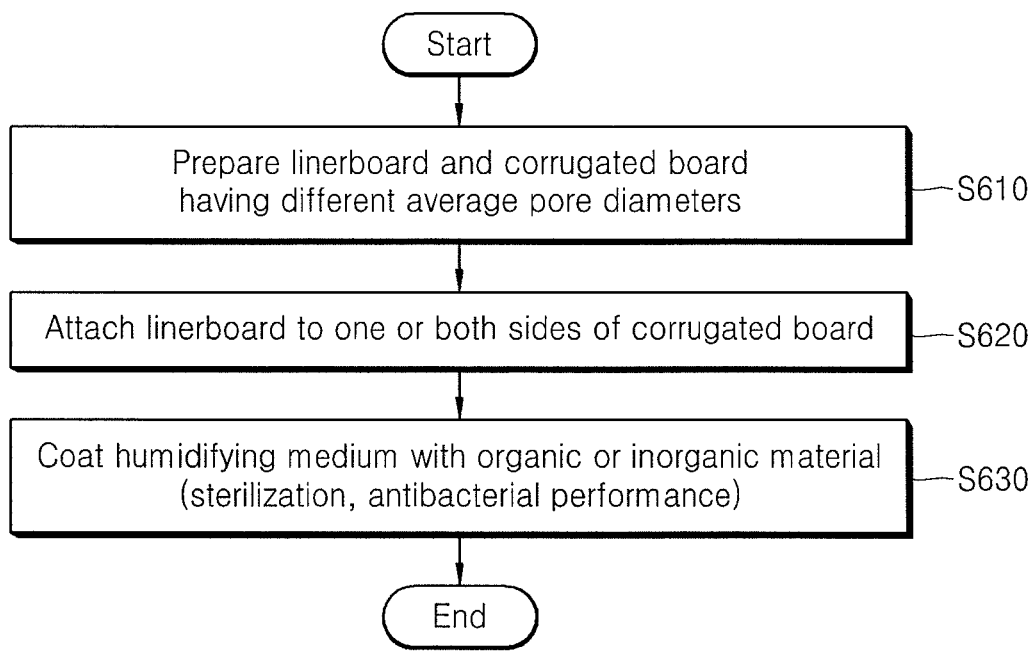
FIG. 6 is a flowchart of a method of manufacturing a humidifying medium according to a further embodiment of the present invention.

FIG. 6 is a flowchart of a method of manufacturing a humidifying medium according to a further embodiment of the present invention.

Referring to FIG. 6, in the method according to this embodiment, operations of preparing a corrugated board and a linerboard (S610) and attaching the linerboard to one or both sides of the corrugated board (S620) are the same as those in S410 and S420 shown in FIG. 4.

However, the method according to this embodiment further includes coating the humidifying medium with an inorganic material or an organic material (S630).

When the materials to be coated on the humidifying medium are $TiO_2$ and alumina, coating is performed as follows.

First, a slurry containing 5~15 parts by weight of ethanol, 1~5 parts by weight of $TiO_2$, and 5~15 parts by weight of alumina sol containing 10~30% by weight of solid based on 100 parts by weight of water is prepared. Then, the humidifying medium is dipped into the slurry. Then, the humidifying medium is dried at 100~150° C. to remove water, ethanol and the like, thereby coating $TiO_2$ and alumina on the humidifying medium.

Ethanol added to the slurry serves as a penetrating agent, and 5~15 parts by weight of ethanol may be present in the slurry based on 100 parts by weight of water. If less than 5 parts by weight of ethanol is present in the slurry, there is no effect of ethanol addition. On the other hand, if more than 15 parts by weight of ethanol is added to the slurry, there can be a problem of clumping the slurry.

$TiO_2$ added to the slurry serves to provide super-hydrophilicity and a photocatalysis function. 1~15 parts by weight of $TiO_2$ may be present in the slurry based on 100 parts by weight of water. If less than 1 part by weight of $TiO_2$ is added, there is no effect of $TiO_2$ addition. If more than 5 parts by weight of $TiO_2$ is added, there can be a problem of coating separation.

Alumina serves as an inorganic binder. Alumina is added to the slurry in the form of sol that contains about 10~30% by weight of solid in order to serve as the binder. 5~15 parts by weight of alumina sol may be present in the slurry based on 100 parts by weight of water. If less than 5 parts by weight of the alumina sol is added, coating may be peeled off due to too small an amount of the alumina inorganic binder remaining after drying. On the other hand, if more than 15 parts by weight of the alumina sol is added, there can be a problem of weakening the photocatalysis function of $TiO_2$ added as above.

FIG. 5 is a flowchart of a method of manufacturing a humidifying medium according to another embodiment of the present invention, and FIG. 6 is a flowchart of a method of manufacturing a humidifying medium according to a further embodiment of the present invention.

Alternatively, the inorganic or organic material may be added to the humidifying medium having a honeycomb structure.

EXAMPLES

Hereinafter, configurations and operations of the present invention will be described in more detail with reference to some examples. However, it should be understood that these examples are provided for illustration only and are not to be in any way construed as limiting the present invention.

Further, details apparent to those skilled in the art will be omitted herein.

1. Preparation of Humidifying Medium

Example

For a humidifying medium of this example, a corrugated board having an average pore diameter of 8~10 μm and a linerboard having an average pore diameter of 8~10 μm were used. The corrugated board was comprised of ceramic paper containing 25% by weight of pulp, and the linerboard was comprised of glass paper containing 30% by weight of pulp.

The prepared humidifying medium was wound to have a honeycomb structure having an outer diameter of 20 cm and an inner diameter of 5 cm.

The humidifying medium was deep-coated in a slurry which was prepared by mixing 600 g of water, 60 g of ethanol, 15 g of $TiO_2$, and 60 g of an alumina sol containing 20% by weight of solid.

Comparative Example

A humidifying medium was made in the same manner as in the example except that the corrugated board and the linerboard having an average pore diameter of 8~10 μm were used.

2. Evaluation

To evaluate the lifespan of the humidifying media, the humidification amount of each of the humidifying media was measured using limewater through a commercial natural humidifier at 25° C. and a relative humidity of 40% by checking a time for the humidification amount to be reduced by 30% as compared with an initial humidification amount.

The limewater was produced in such a way that 15 g of $Ca(OH)_2$ was added to 5 kg of water and stirred for 30 minutes, and then left for 24 hours to deposit $CaCO_3$ from $CO_2$ in water; and $CaCO_3$ was filtered to reach a level of Ca 800 ppm. Considering that general tap water has a Ca level of 15 ppm, it can be understood that the produced limewater is severer at least 20 times than the general tap water.

In consideration of such severe condition of limewater, the expected lifespan of the humidifying medium operating for 12 hours a day was calculated by 20 times increasing the time for the humidification amount to be reduced by 30% as compared with the initial humidification amount.

3. Evaluation Results

When the corrugated board and the linerboard having an average pore diameter of 8~10 μm were used, about 45 hours were taken to decrease the humidification amount by 30% as compared with the initial humidification amount and the expected lifespan of the humidifying medium operating 12 hours a day was 75 days (45×20/12).

On the other hand, when the corrugated board having an average pore diameter of 8~10 μm and the linerboard having an average pre diameter of 35~40 μm were used, about 110 hours were taken to decrease the humidification amount by 30% as compared with the initial humidification amount, and the expected lifespan of the humidifying medium operating 12 hours a day was 180 days (110×20/12).

This shows that a humidifying medium including a corrugated board having an average pore diameter of 8~10 μm and a linerboard having an average pore diameter of 35~40 μm exhibit an improved lifespan that is two or more times that of a humidifying medium including a corrugated board and a linerboard both having an average pore diameter of 8~10 μm.

Although some embodiments have been described herein, it should be understood by those skilled in the art that these embodiments are given by way of illustration only, and that various modifications, variations, and alterations can be made without departing from the spirit and scope of the invention. Therefore, the scope of the invention should be limited only by the accompanying claims and equivalents thereof.

The invention claimed is:

1. A humidifying medium comprising a corrugated board and a linerboard coupled to one or both sides of the corrugated board, the corrugated board and the linerboard having different average pore diameters.

2. The humidifying medium of claim 1, wherein the average pore diameter of the linerboard is larger than that of the corrugated board.

3. The humidifying medium of claim 2, wherein the average pore diameter of the linerboard is 3~6 times larger than that of the corrugated board.

4. The humidifying medium of claim 1, wherein the linerboard or the corrugated board comprises inorganic paper ceramic paper or glass paper.

5. The humidifying medium of claim 1, wherein the humidifying medium is wound to have a honeycomb structure.

6. The humidifying medium of claim 1, wherein the humidifying medium is coated with an inorganic material or organic material comprising a disinfectant material or an antibacterial material.

7. The humidifying medium of claim 1, wherein the humidifying medium is coated with $TiO_2$ and alumina.

8. A humidifying medium wherein a linerboard having an average pore diameter of 35~50 μm is coupled to one or both sides of a corrugated board having an average pore diameter of 8~10 μm.

9. The humidifying medium of claim 8, wherein the linerboard or the corrugated board comprises ceramic paper or glass paper.

10. The humidifying medium of claim 8, wherein the humidifying medium is wound to have a honeycomb structure.

11. The humidifying medium of claim 8, wherein the humidifying medium is coated with an inorganic material or organic material comprising a disinfectant material or an antibacterial material.

12. The humidifying medium of claim 8, wherein the humidifying medium is coated with $TiO_2$ and alumina.

13. A method of manufacturing a humidifying medium, comprising:
   preparing a linerboard and a corrugated board having different average pore diameters; and
   coupling the linerboard to one or both sides of the corrugated board.

14. The method of claim 13, further comprising: winding the humidifying medium to have a honeycomb structure.

15. The method of claim 13, further comprising: coating the humidifying medium with an inorganic material or organic material comprising a disinfectant material or an antibacterial material.

16. The method of claim 13, wherein the manufactured humidifying medium is dipped into slurry that contains 100 parts by weight of water, 5~15 parts by weight of ethanol, 1~5 parts by weight of $TiO_2$, and 5~15 parts by weight of alumina sol containing 10~30% by weight of solid, followed by drying at 100~150° C.

* * * * *